United States Patent
Mertens et al.

(10) Patent No.: US 6,415,510 B2
(45) Date of Patent: Jul. 9, 2002

(54) METHOD OF FABRICATING LEADING EDGE NOSE STRUCTURES OF AERODYNAMIC SURFACES

(75) Inventors: Josef Mertens; Henri Lajain, both of Bremen (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 09/781,032

(22) Filed: Feb. 8, 2001

(30) Foreign Application Priority Data

Feb. 8, 2000 (DE) .......................... 100 05 348

(51) Int. Cl.⁷ .............................. B21D 53/88
(52) U.S. Cl. ............... 29/897.2; 29/897.32; 29/449; 29/464; 29/469; 29/525.06; 29/525.14
(58) Field of Search ................ 29/897.2, 897, 29/889.7, 897.3, 897.32, 448, 449, 469, DIG. 3, 464, 458, 466, 525.02, 525.06, 525.14, 525.13; 72/395, 308, 309; 156/221, 228; 244/123

(56) References Cited

U.S. PATENT DOCUMENTS

| | | | |
|---|---|---|---|
| 1,811,259 A | * | 6/1931 | Curtis |
| 2,563,218 A | | 8/1951 | Darracott et al. |
| 2,567,124 A | * | 9/1951 | Roberts |
| 3,299,688 A | * | 1/1967 | Gray |
| 3,388,446 A | * | 6/1968 | Phillips |
| 3,429,023 A | * | 2/1969 | Blythe et al. |
| 3,712,106 A | * | 1/1973 | Holsapple et al. |
| 3,832,879 A | * | 9/1974 | Holden |
| 4,498,325 A | * | 2/1985 | Reccius et al. |
| 4,618,089 A | * | 10/1986 | Hanada et al. |
| 4,783,228 A | * | 11/1988 | Aker et al. |
| 6,050,523 A | | 4/2000 | Kraenzien |

FOREIGN PATENT DOCUMENTS

| | | |
|---|---|---|
| DE | 713281 | 11/1941 |
| DE | 19649132 | 5/1998 |
| GB | 634583 | 5/1947 |

* cited by examiner

Primary Examiner—S. Thomas Hughes
Assistant Examiner—T. Nguyen
(74) Attorney, Agent, or Firm—W. F. Fasse; W. G. Fasse

(57) ABSTRACT

A method of fabricating an aircraft leading edge nose structure includes the following steps. Parallel strengthening members are welded onto a flat planar outer skin sheet. Two forming tool members having appropriately shaped outer contours contact the inner surfaces of the strengthening members, and are then pivoted and shifted toward each other so as to bend the outer skin sheet into a parabolic shape along the curved contour defined by the forming tool members. The resulting bent outer skin sheet with the strengthening members welded thereon is secured into a negative mold. To provide boundary layer suction, a perforated throttling sheet, inner ribs, and a non-perforated inner skin sheet may be successively secured by sealant and blind rivets onto the pre-bent structure of the outer skin sheet and the strengthening members. The finished structure is then removed from the mold.

11 Claims, 2 Drawing Sheets

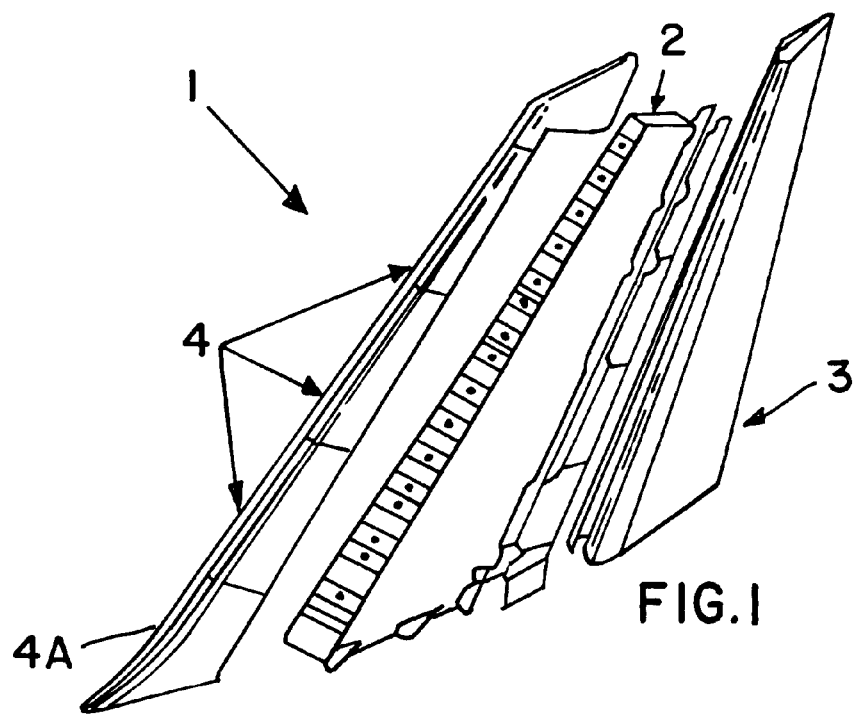
FIG.1
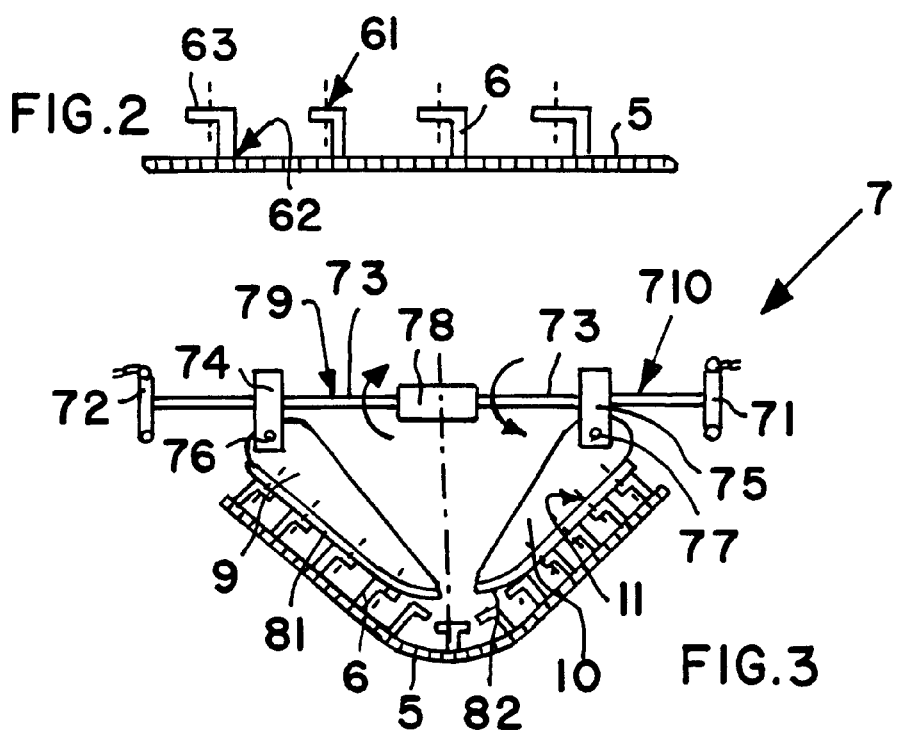
FIG.2
FIG.3

METHOD OF FABRICATING LEADING EDGE NOSE STRUCTURES OF AERODYNAMIC SURFACES

This application is based on and claims the priority under 35 U.S.C. §119 of German Patent Application 100 05 348.3, filed on Feb. 8, 2000, the entire disclosure of which is incorporated herein by reference.

FIELD OF THE INVENTION

The invention relates to a method of fabricating a leading edge nose structure of an aerodynamic surface such as wing or a tail fin of an aircraft. The method involves bending or forming fuselage skin sheets and joining strengthening components onto the skin sheets.

BACKGROUND INFORMATION

Conventional wings of known aircraft types are fabricated as riveted and adhesively bonded aluminum constructions. The leading edge nose structure of the tail fin of such a known aircraft similarly is constructed of aluminum, glass fiber composites, graphite fiber composites, or carbon fiber composites, which are disadvantageously subject to erosion. In fabricating such known metal structures of aerodynamic surfaces, the fuselage skin sheets are formed over positive cores before the sheets are joined together. Other solutions or methods of fabricating the leading edge nose structure of an aerodynamic surface, and especially such a leading edge nose structure that allows boundary layer control by suction of boundary layer air through holes in the leading edge nose structure, have not been successfully developed or brought into practice. Nonetheless, the development of such improved methods of fabricating such leading edge nose structures is becoming ever more important in the field of aircraft construction, due to the constant efforts to reduce manufacturing costs and to improve the resulting aerodynamic structures with regard to an improvement of the aerodynamics, a reduction of the weight, and a resulting reduction of fuel consumption and increase of the maximum cruise flight range of the aircraft.

Previously known constructions for leading edge structures enabling a boundary layer suction all suffer from several common disadvantages, which has made it impossible or impractical to carry out such methods in large scale assembly line or series production of aircraft components. For example, the Boeing Company successfully tested a hybrid laminar technology in flight tests with the Boeing 757 aircraft. In that context, the connection of the several suction chambers was carried out by gluing or adhesively bonding together trapezoidal shaped metal sheets with relatively large joint surfaces on the aircraft outer skin.

Disadvantageously, the large joint surfaces of the adhesively bonded surfaces covered a rather large proportion of the suction holes, i.e. the aerodynamic surfaces provided with perforated holes therein. As a result, this known joining method has been very critically reviewed and judged, for example also with respect to the operating life and with respect to the application of internal pressure for cleaning and de-icing the suction structure.

Another known fabrication method involves warm deforming and joining of components in a vacuum soldering oven or furnace, using negative and positive cores made of steel. In this known method, considerable problems have arisen from the local and global deformations which require an extremely complicated and costly temperature control and variation. Additional difficulties have been caused by crystal transformations in the materials during the process. It has further been found in practice that the weight and the stiffness of the components cannot be brought down to acceptable values for making such a known method useful for the series production of a high volume of components.

Another known approach was the wind tunnel model of the so-called ELFIN II wing (an acronym for "European Laminar Flow Investigation"), of which the components were joined together by adhesive bonding or gluing. While the results seemed acceptable for test purposes, such a fabrication method does not appear to be practical for high volume series production, because high manufacturing costs and a low operating life are expected. Also, on technical grounds the required interior pressurization for cleaning and for de-icing the suction structures is lacking.

SUMMARY OF THE INVENTION

In view of the above, it is an object of the invention to provide a method of fabricating a leading edge nose structure for an aerodynamic surface, especially for use in the manufacture of aircraft, which is able to form almost any desired aerodynamic contour with a high contour accuracy and true reproduction of the desired contour, while maintaining tight construction tolerances and achieving a high surface quality. The method particularly aims to avoid the use of cost-intensive and complex deformation techniques using positive mold cores or warm deformation of the material. To the contrary, the invention aims to reduce the manufacturing cost, effort and complexity, so as to enable the series production of a high volume of aerodynamic surface components. The invention further aims to avoid or overcome the disadvantages of the prior art, and to achieve additional advantages, as apparent from the present specification.

The above objects have been achieved according to the invention in a method of fabricating a leading edge nose structure of an aerodynamic surface, using a bending apparatus including two longitudinally movable guide elements movably arranged and supported on a threaded spindle, such that a rotation of the threaded spindle is transferred to a sliding motion of the two guide elements either toward each other or away from each other.

A respective forming tool member with a defined outer contour is articulately connected by a respective pivot joint to each respective one of the guide elements. The method according to the invention proceeds as follows.

Metal stringers or other profile element segments acting as strengthening members are arranged substantially parallel to each other and are then mechanically secured to a metal outer skin sheet that is in a flat planar configuration. For example, the strengthening members are laser welded or soldered onto the outer skin sheet so that the major profile web of each strengthening member stands substantially perpendicularly relative to the plane of the outer skin sheet. The bending apparatus is then configured and positioned so that the left and right forming tool members are arranged with their outer contour surfaces respectively contacting the back or inner contact surfaces of the strengthening members, while extending substantially crosswise across the strengthening members. At this point, the outer skin sheet is initially still in a substantially flat planar configuration.

Then respective outermost ones of the strengthening members are secured respectively to the left and right forming tool members by respective assembly pins. Next, the bending apparatus is operated to move the guide elements stepwise toward one another so that the left and right forming tool members pivot and slide relative to one another and thereby pull the outer skin sheet along with the moving forming tool members, so as to step-wise bend the outer skin sheet into a bent form that is generally in the shape of a parabola on a plane substantially perpendicular to the longitudinal extending strengthening members. This bent form of the outer skin sheet is determined by the similarly curved outer contour of the left and right forming tool members, against which the inner contact edge of each strengthening member is pulled, as well as a free-form parabolic curve of the outer skin sheet spanning the gap between the two forming tool members following the pivoting motion of the two forming tool members.

During this step-wise bending process, successive ones of the strengthening members are secured to the respective forming tool members by respective assembly pins, as each step of bending successively brings the next successive pair of strengthening members into contact with the forming tool members. This process is continued until the outer skin sheet has been bent or deformed into a curved aerodynamically contoured nose shape as seen in a cross-section plane perpendicular to the center line of the outer skin sheet or perpendicular to the strengthening members, in the area of the respectively adjacent free ends of the two forming tool members. The above described bending process is a cold bending or cold forming process, which may be carried out at room temperature (e.g. 60° F. to 100° F.).

The preliminary nose structure that has been joined together and then flexed or bent to apply a pre-tension thereto in the above described manner is then positioned into a negative form or mold, which has an inner contour substantially matching and following (while compensating tolerances) the generally parabolic curve contour of the outer skin sheet that has been formed as described above. Then, the two longitudinally extending edges of the outer skin sheet are secured to prevent the deformed nose structure from springing out of the negative form, by several securing plates which are distributed along the longitudinally extending edges of the negative form and which retain the edges of the outer skin sheet. Next, the above mentioned assembly pins are removed, to release the inner contact surfaces of the strengthening members from the left and right forming tool members, so that the bending apparatus can then be removed and retracted away from the nose structure.

Further steps according to the inventive method may then be carried out as follows, especially if the nose structure is to provide for boundary layer suction. After the preliminary nose structure has been arranged in the negative form or mold as described above, perforated throttling sheets, which have been pre-formed into a shape similar to a parabola generally matched or adapted to the parabolic contour of the outer skin sheets, are then arranged in a row and butted against one another in the longitudinal direction on the inside of the preliminary nose structure, i.e. contacting the inner contact edges of the strengthening members, after having applied a sealant at defined locations between the inner perforated throttling sheets and the strengthening members, wherever required. The inner perforated throttling sheets are then secured to the inner contact edges of the strengthening members by respective blind rivets. The non-abutting crosswise extending edge of the last perforated throttling sheet in the row of these sheets ends and extends perpendicularly above or inwardly along the skin sheet crosswise edge, while the longitudinal edges of the throttling sheets extend perpendicularly inwardly along the longitudinally extending edges of the skin sheets.

Next, a plurality of inner ribs that have been previously bent into a parabolic shape matching that of the throttling sheets, are provided with a sealant on the back or outwardly directed surfaces thereof and are then placed onto the inwardly facing surface of the throttling sheets so as to extend generally crosswise relative to the longitudinal centerline of the leading edge nose structure. These inner ribs are then secured by respective blind rivet connections.

Then, a plurality of flanged U-section members having a "hat-shaped" sectional profile are provided with a sealant applied thereto, and are arranged running substantially parallel to one another along the longitudinal direction of the leading edge nose structure, on the inner parabolic surface of the inner throttling sheets, and are secured thereto by additional blind rivet connections. Thereafter, a plurality of longitudinally extending inner skin sheets are provided with a sealant along their longitudinally extending edges, and then these edge portions are arranged on the protruding flanges of the flanged U-section members and connected thereto by additional blind rivet connections. In the above manner, the leading edge nose sandwich structure has been essentially completed with a sandwich construction, which is then removed out of the negative form or mold after releasing the securing plates.

BRIEF DESCRIPTION OF THE DRAWINGS

In order that the invention may be clearly understood, it will now be described in connection with an example embodiment, with reference to the accompanying drawings, wherein:

FIG. 1 is a schematic exploded perspective view of the principle components of an aircraft fin and rudder assembly allowing for boundary layer suction;

FIG. 2 is a sectional view of an initial planar condition of an outer skin sheet with parallel stringers mounted thereon;

FIG. 3 is a cross-sectional view of a bending apparatus for carrying out the cold bending of the illustrated leading edge nose structure, according to the invention;

Figure 4:
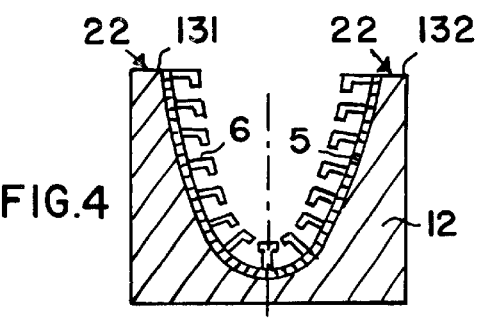
FIG. 4 is a sectional view of a negative mold or form with the leading edge nose structure of FIG. 3 arranged and secured therein.

DETAILED DESCRIPTION OF PREFERRED EXAMPLE EMBODIMENTS AND OF THE BEST MODE OF THE INVENTION

As shown in FIG. 1, the fin and rudder assembly 1 of an aircraft includes a tail fin 4A with a leading edge nose 4, as well as a fin support structure or particularly a torsion box 2, and a rudder 3. The general structure of this fin and rudder assembly 1 can be according to any conventionally known principles and design, but special attention will be directed herein to the leading edge nose 4, which is actually made up of a plurality of nose portions that are arranged one after another in the span direction, for example an upper fin nose portion that sweeps back to the fin tip, a lower fin nose portion that extends and merges into the fin root, and a middle fin nose portion that extends between the upper and lower portions. The support structure 2 is particularly a carbon fiber reinforced composite torsion box structure 2. The above described leading edge nose 4 is secured to the front side of the torsion box structure 2. The rudder 3 is pivotably arranged on the rear spar of the supporting torsion box structure 2.

The nose structure 4, or at least one of the portions thereof, is provided with perforations through the outer skin thereof, and air channels therein, in order to allow boundary layer air flowing along the respective nose portion to be sucked or suctioned off, through the perforations into the air channels within the leading edge nose structure, especially at the areas of the aerodynamic stagnation lines along the nose structure surface, in order to advantageously influence the aerodynamic resistance in these areas during flight of the aircraft. The leading edge nose structure is further provided with suction ports or tappings to suction and carry away the boundary layer air that has been sucked into the air channels. These features can be according to any conventionally known teachings.

The present inventive method of manufacturing such a leading edge nose structure 4 will now be described in an example embodiment with reference to the subsequent Figures. First referring to FIG. 2, continuous metal stringers 6 or local securing elements such as sections of stringers 6, or generally referenced strengthening members 6, are arranged on a flat planar outer skin sheet 5, which is, for example, made of an aluminum alloy, titanium or a titanium alloy, or chrome nickel steel. Any conventionally known joining techniques, such as riveting, soldering, brazing, adhesive bonding or gluing, and welding, such as laser welding or diffusion welding, can be used for joining the strengthening members 6 onto the flat planar skin sheet 5. The strengthening members 6 extend substantially parallel to one another, and substantially parallel to a longitudinal center line of the skin sheet 5, whereby the major webs of the strengthening members 6 protrude substantially perpendicular relative to the plane of the outer skin sheet 5.

In order to achieve an inwardly curved, generally parabolic bend or curved form of the nose structure, the inventive method uses a bending apparatus 7 that comprises a two-part crank rod or threaded spindle 73 including a left spindle part and a right spindle part that are respectively provided with a right-hand external threading 710 and a left-hand external threading 79 (or vice versa), and respectively have a left-crank 72 and/or a right-crank 71 mounted respectively on opposite ends thereof. The threaded spindle 73 is rotatably supported at its center in a spindle housing 78.

Two guide elements 74 and 75 are internally threaded with respective opposite threadings, and are respectively arranged on and engage the external threading of the left-spindle part and the right-spindle part. Thereby, in view of the two opposite threading directions, a rotation of the threaded spindle 73 using the right-crank 71 and/or the left-crank 72, will respectively move the guide elements 74 and 75 toward each other or away from each other along the threaded spindle 73. In other words, the rotational motion of the spindle 73 is converted via the internal threading of the respective guide elements 74 and 75 engaging the external threadings of the threaded spindle 73, into linear motion of the respective guide elements 74 and 75 along the spindle 73. Rather than the cranks 71 and 72, one or two drive motors may be provided for rotationally driving the threaded spindle 73.

Respective left and right pivot joints 76 and 77 are provided on the guide elements 74 and 75, and pivotally connect respective left and right forming tool members 9 and 10 to the respective guide elements 74 and 75. Each of these forming tool members 9 and 10 respectively comprises a forming rib or actually half-rib, which may be formed with the necessary contour out of a hardwood or the like, and may further optionally comprise respective bending jig plates 81 and 82 secured on the outer edges of the respective forming ribs, i.e. the edges facing outwardly away from the threaded spindle 73 and the spindle housing 78. These bending jig plates may be made of a chrome nickel steel or the like, and have a curved outer contour that matches the curved contour of the edges of the respective ribs of the left and right forming tool members 9 and 10. These respective curved contours of the left and right forming tool members 9 and 10 together will form the desired generally parabolic curved contour to which the nose structure will be bent.

To begin the bending of the preliminary nose skin structure shown in FIG. 2, the guide elements 74 and 75 are moved to an initial position spread widely apart from one another, with the forming tool members 9 and 10 pivoted from the respective guide elements inwardly toward one another (i.e. toward the center plane) so that the outer bending jig contour surfaces thereof lie on a flat plane. The forming tool members 9 and 10 are then brought into contact with the contact surfaces of the stiffening flanges 63 of at least the outermost ones of the strengthening members 6 located farthest from the longitudinal center plane, and these outermost ones of the strengthening members 6 are secured to the forming tool members 9 and 10 by inserting respective assembly pins 11 through holes 61 in the stiffening flanges 63 of the strengthening members 6, and corresponding holes in the bending jig plates 81 and 82 of the forming tool members 9 and 10.

Then, the threaded spindle 73 is rotated in the appropriate direction to move the guide elements 74 and 75 stepwise toward each other, which pulls and pivots the forming tool members 9 and 10 away from the flat plane and successively into an ever-tighter curvature. This correspondingly pulls and bends the outer skin sheet 5, to bring the curved bending jig contour of the bending jig plates 81 and 82 successively into contact with the inwardly facing contact surfaces of the stiffening flanges 61 of successive pairs of the strengthening members 6. As each successive strengthening member 6 comes into firm resting contact against the respective bending jig plate 81 and 82, a respective further assembly pin 11 is used to secure each of the strengthening members 6 to the forming tool members 9 and 10. During this process, the outer skin sheet 5 is successively bent into a curved generally parabolic contour shape, as shown in FIG. 3 in an intermediate condition. Namely, as the forming tool members 9 and 10 are pulled and pivoted inwardly toward each other, the preliminary structure shown in FIG. 2 is pulled along with the forming tool members 9 and 10 and bent into a contour shape adaptingly along the curved outer contour of the bending jig plates 81 and 82 of the forming tool members 9 and 10 as well as a free-form parabolic curve of the outer skin sheet spanning the gap between the two forming tool members following the pivoting motion of the two forming tool members. This bending process is continued until the ultimately desired finished curved contour of the outer skin sheet 5 is achieved, as shown in FIG. 4.

Thereafter, the completely bent or curved outer skin sheet 5 with the strengthening members 6 joined thereon is inserted into a negative form or mold 12 that is, for example, made of hardwood and has an inner curved contour that matches or corresponds to the desired finished outer contour of the leading edge nose structure 4. The preliminary bent structure of the outer skin sheet 5 with the strengthening members 6 thereon is secured into the negative form 12 using left and right securing plates 131 and 132 along the outer edges of the negative form 12, so that these securing plates 131 and 132 retain the edges of the preliminary outer skin sheet structure and prevent this structure from springing out of the negative form 12, as shown in FIG. 4. Once the preliminary bent structure has been secured in the negative form 12, the above mentioned assembly pins 11 are removed, to release the bending apparatus 7 from the preliminary bent structure, and then the bending apparatus 7 is retracted or moved away.

The leading edge nose preliminary structure that has been fabricated in the above manner, with the form thereof shown in FIG. 4, is suitable for any conventional leading edge nose structures of aerodynamic surfaces in which no boundary layer suction is to be provided. In other words, in such an embodiment, the outer skin sheet 5 is a solid non-perforated sheet, and there is no need of forming internal suction channels for sucking away boundary layer air. Thus, the resulting structure as shown in FIG. 4 can be removed from the negative form or mold 12 and used as a leading edge nose structure of a conventional wing, tail fin, or tail plane leading edge of an aircraft without boundary layer suction. In this context it is advantageous to rivet a plurality of inner form ribs extending in the crosswise direction onto the inner surfaces of the strengthening members 6, before removing this structure from the negative form or mold 12, in order to take up the pre-stress forces and hold and maintain the structure in its curved configuration after it is removed from the negative form 12.

In contrast to the above simple embodiment, it is preferred to provide a leading edge nose structure with perforations or the like through which boundary layer air may be suctioned off, for achieving a boundary layer control as described above. For such an embodiment, the outer skin sheet is provided with numerous small perforation holes therein at the appropriate locations. It is further necessary to form air channels and a proper suction distribution arrangement within the leading edge nose structure for distributing the suction air flow along the perforated surface of the outer skin sheet 5. To achieve this, several additional steps are carried out after the configuration shown in FIG. 4 has been achieved.

Figure 5:
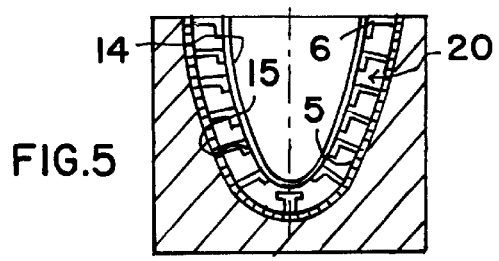
FIG. 5 is a view similar to that of FIG. 4, but showing a further step in which a suction air throttling sheet has been mounted on the stringers.
Figure 6:
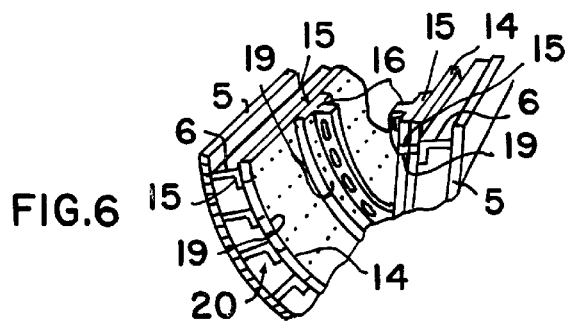
FIG. 6 is a perspective view generally showing the arrangement of FIG. 5, in a further subsequent step in which an inner rib has been secured onto the throttling sheet.

As a first additional step, a so-called perforated throttling sheet 14 is to be arranged on the inner contact surface of the stringers or other strengthening members 6. To achieve this, plural perforated throttling sheets 14 are provided with a sealant 15 at the appropriate locations of intended contact on the strengthening members 6, and are then arranged on the inwardly facing contact surfaces of the strengthening members 6 in the negative form 12. The several throttling sheets 14 are arranged butted against one another (or slightly overlapping) in a row along the longitudinal direction parallel to the longitudinal center line of the outer skin sheet or of the leading edge nose structure. In this context, the throttling sheets 14 have been bent or curved into the appropriate generally parabolic shape, in a preceding step, to match smoothly onto the inner parabolic curve defined by the contact surfaces of the strengthening members 6 in the configuration as shown in FIG. 5. The sealant 15 has been applied at the locations of contact between the throttling sheets 14 and the inwardly facing contact surfaces of the strengthening members 6. Additionally, blind rivets 19 are used to secure the throttle sheets 14 onto the strengthening members 6. In this arrangement, the free non-butting crosswise edge of the last one of the throttling sheets 14 in the row, ends perpendicularly above the corresponding crosswise edge of the outer skin sheet 5, while the lengthwise edges of the throttling sheets 14 also terminate along and perpendicularly above or inwardly from the longitudinal edges of the outer skin sheets 5. By arranging the throttling sheets 14 with the sealant 15 in this manner, respective pre-chambers 20 for the suction air are respectively formed and bounded between the outer skin sheet 5 and the throttling sheets 14, and between the respective adjacent strengthening members 6, as shown in FIG. 5 (and FIG. 6).

In a next successive step, inner ribs 16 are secured onto the above described semi-finished sandwich structure of the outer skin sheet 5, the strengthening members or stringers 6, and the throttling sheets 14. This connection is also achieved with a sealant and blind rivets, to achieve the further structure shown in FIG. 6. In greater detail, each inner rib 16 is first formed to match the inner parabolic curvature of the throttling sheets 14, and then the outwardly directed contact surface of each inner rib 16 is provided with a further sealant 15. Then the respective inner rib 16 is positioned overlappingly along a respective butting edge joint between two adjacent throttling sheets 14, extending in the crosswise direction. Each inner rib 16 is then additionally secured by blind rivets onto the underlying throttling sheets 14. This achieves the intermediate construction shown in FIG. 6.

Figure 7:
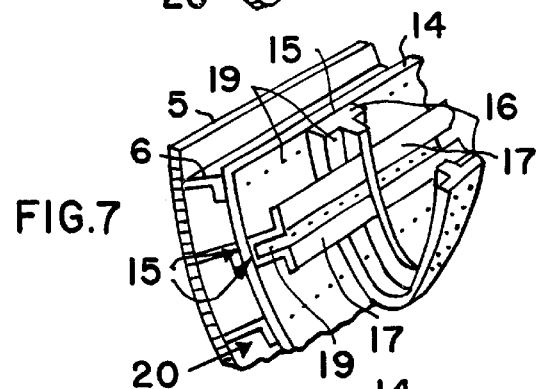
FIG. 7 is a view generally similar to that of FIG. 6, but showing a further subsequent step in which a flanged U-section member has been guided through the inner rib and secured onto the throttling sheet.

FIG. 7 shows the result of the next step, wherein a plurality of flanged U-section members 17 or "hat profile members" are arranged to extend parallel to each other in the leading edge longitudinal direction respectively through holes or notches provided in the inner ribs 16. Each one of the flanged U-section members 17 is arranged with the U-section standing upright on the underlying throttling sheet 14, and the protruding flanges thereof lying along an inner parabolic contour. Sealant 15 is provided between the underlying throttling sheet 14 and the respective U-section members 17, and additional blind rivets 19 secure the U-section members 17 onto the throttling sheet 14 and/or the underlying strengthening member 6. The boundaries of air communication to each respective underlying air suction pre-chamber 20 are thereby defined by the locations of the U-section members 17. Namely, the U-section members 17 form boundaries of collecting plenum chambers 21 as will be discussed further below. The ends of the U-section members 17 terminate flush with the crosswise edges of the underlying throttling plates 14.

Finally, in order to form the above mentioned air collecting plenum chambers 21, a plurality of solid non-perforated metal inner skin sheets 18 are secured and sealed with blind rivets 19 and sealant 15 to the protruding flanges on the inner contour side of the flanged U-section members 17. Successive inner skin sheets 18 are thereby arranged abutting one another end-to-end (or overlapping) along the longitudinal direction along the leading edge nose structure. A respective air collecting plenum chamber 21 is thus formed respectively between the throttling plates 14 and the inner skin sheets 18, and respectively between neighboring ones of the U-section members 17. By applying suction in any conventionally known manner to these plenum chambers 21, the suction is appropriately distributed and controlled through the throttling sheets 14 and the outer air suction pre-chambers 20 to the suction holes or perforations in the outer skin sheets 5. The resulting structure and air distribution through the plenum chambers 21 and the pre-chambers 20 can be understood from FIG. 8.

As a final step, the above described finished configuration of the leading edge nose sandwich structure is removed from the negative form 12 by releasing the securing plates 131 and 132. The leading edge nose structure is now ready to be installed as a component of an aircraft aerodynamic surface in any known construction technique and arrangement.

Further details of the inventive method will now be emphasized with brief additional comments. The substantially parabolic shape of the outer skin sheets 5 is established or determined by the substantially parabolic shape of the forming tool members 9 and 10, or particularly the bending jig plates 81 and 82 thereof, as well as a free-form parabolic curve of the outer skin sheet 5 spanning the gap between the two forming tool members, when these are moved to their inwardly pivoted position. The proper or desired curvature can thereby be achieved simply by providing the respective required curvature for the forming tool members 9 and 10. This substantially parabolic contour is then matched by the inner curvature of the negative form 12. Throughout this specification it should be understood that the term "substantially parabolic" and similar terms describing this curvature do not necessarily require a true mathematically defined parabola, but rather relate to any desired aerodynamically curved contour that is suitable for a leading edge nose structure.

The above described joining of the stringers or other strengthening members 6 onto the outer skin sheets 5 in a flat planar configuration is carried out in any known manner to achieve a rigid, permanent, integral material interconnection between the strengthening members 6 and the skin sheets 5. Preferably, these joints are achieved by soldering or welding using laser welding technology. Also, to achieve proper airtight sealing of the several air flow channels or passages, any known suitable sealant 15 is preferably arranged along and between all of the joint areas, and particularly all of the joints secured by blind rivets 19.

It is further noted that a respective one of the strengthening members 6 positioned along the longitudinal center line of the leading edge nose structure preferably has a T-sectional shape while the remaining strengthening members 6 each have an inverted L-sectional shape. This T-sectional strengthening member 6 extends directly along the forward longitudinal edge of the leading edge nose structure to form a symmetrical center line of the parabolic bending or curvature by means of the forming tool members 9 and 10. A non-symmetrical curvature may also be achieved, as needed, by simply providing the appropriate shaped forming tool members 9 and 10 and the negative mold 12.

As a further detail, it is noted that the throttling sheets 14 may be pre-bent or pre-curved using the same bending apparatus 7 with the same forming tool members 9 and 10, or similar forming tool members with a slightly different matching curvature, to provide the appropriate curvature for the throttling sheets 14 to be arranged on the inner contour of the strengthening members 6 as shown in FIG. 5. In this context the throttling sheets 14 can also be connected to the forming tool members 9 and 10 using assembly pins 11 as described above.

The removal or retraction of the bending apparatus 7 as described above can be carried out in a stepwise or a stagewise manner corresponding to the successive stages of assembling or arranging the throttling sheets 14 and the ribs 16. Alternatively, the bending apparatus 7 may be entirely withdrawn or retracted in a single step at the stage shown in FIG. 4.

Figure 8:
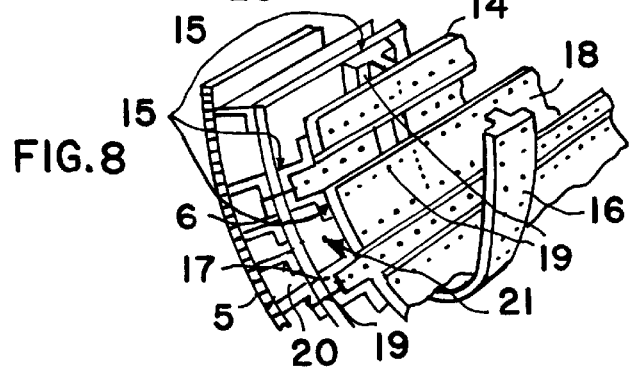
FIG. 8 is a view generally similar to that of FIG. 7, but showing the next subsequent step in which an inner skin sheet has been secured onto the protruding flanges of respective adjacent ones of the U-section members.

The removal of the finished leading edge nose sandwich structure out of the negative form 12 could alternatively be carried out before the step shown in FIG. 8, rather than after completion of the step shown in FIG. 8.

Throughout this specification, when two components (such as the strengthening members for example) are said to be "substantially parallel" or even "parallel", this is not intended to require precise parallelism, but rather only that the components extend generally in the same direction without crossing each other, and only within an ordinary degree of manufacturing tolerances in the aircraft manufacturing art. For example, the stringers may typically extend along barrel-shaped or conical or tapering curved surfaces, but are still considered to be "substantially parallel". The terms "perpendicular" and "substantially perpendicular" are to be understood with a similar degree of tolerance. Similarly, when two contours are said to "correspond" to one another, that is to be understood as allowing for ordinary manufacturing tolerances, and the differences in curvature that are necessary for nesting or fitting one contour into the other.

The inventive method provides several advantages in the field of aircraft construction. A substantially conventional nose for aircraft wings, tail fins and tail planes, must have an aerodynamic contour with suitable structural tolerances, and must protect the underlying supporting structure from external damage, as well as incorporating arrangements for deicing. Laminar suction nose structures must additionally have a very high contour accuracy, and make possible a complex internal structure for achieving the suction system. The inventive method makes it possible to construct substantially conventional nose structures, as well as specially featured nose structures, with reduced costs, improved erosion resistance, and relatively low weight. The cost efficiency or economy of the present manufacturing method has been proven in trial runs or experiments. The laminar technology utilized according to the invention promises the highest potential for reducing fuel consumption of commercial transport aircraft, among all technologies that have been investigated to the present date. In view of these advantages, the invention provides a suitable fabrication method for the high volume series production of laminar suction structures that may be used for the leading edge nose structures of wings as well as empennage surfaces. All of the requirements of the surface quality (e.g. roughness, waviness, form or contour accuracy, etc.), the weight, the stiffness, the protection against damage (e.g. due to bird strikes or other impact damage), the airtight sealing, and the ease of repair, are all met by the inventive method being used to fabricate leading edge nose structures.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method of fabricating a leading edge nose structure of an aerodynamic surface, comprising the following steps:

a) joining plural metal strengthening members that extend in a longitudinal direction and that are laterally spaced apart from one another onto a flat planar metal outer skin sheet, so as to form thereof a preliminary flat planar structure;

b) after said step a), deforming said preliminary flat planar structure by contacting and securing at least some of said strengthening members onto a curved contour of a positive forming tool and reconfiguring said positive forming tool so as to increase a curvature defined by said curved contour, and thereby bending said outer skin sheet to have an outer sheet contour with a cross-sectional nose curvature corresponding to said curved contour, so as to form of said preliminary flat planar structure a preliminary curved structure;

c) after said step b), placing and securing said preliminary curved structure into a negative form so that said outer skin sheet contacts and is supported by a negative form surface of said negative form having a negative contour corresponding to said outer sheet contour; and d) after said step c), releasing and removing said positive forming tool from said preliminary curved structure;

wherein said step b) is carried out using a bending apparatus that includes a rotatable threaded spindle, first and second threaded guide elements which are thread-engaged on said threaded spindle, and said positive forming tool which includes separate first and second forming tool members that each have a respective portion of said curved contour and that are respectively pivotally connected to said first and second threaded guide elements; and wherein said contacting and securing of said strengthening members onto said curved contour of said positive forming tool and said reconfiguring of said positive forming tool is carried out in a stepwise progressive manner and comprises securing two laterally outermost ones of said strengthening members respectively to said first and second forming tool members, rotating said threaded spindle to move said first and second threaded guide elements linearly toward one another and thereby pivoting said first and second separate forming tool members relative to one another so as to increase said curvature defined by said curved contour comprising said respective portions of said curved contour on said first and second forming tool members, then contacting and securing onto said first and second forming tool members two more of said strengthening members that are respectively inwardly adjacent to said two laterally outermost ones of said strengthening members, and then continuing said pivoting of said first and second forming tool members in successive pivoting steps and successively securing inwardly successive pairs of said strengthening members onto said first and second forming tool members between successive ones of said pivoting steps, while said deforming of said preliminary flat planar structure progresses correspondingly in a stepwise manner.

2. The method according to claim 1, wherein said step b) is carried out so that said cross-sectional nose curvature is substantially a parabola.

3. A method of fabricating a leading edge nose structure of an aerodynamic surface, comprising the following steps:

a) joining plural metal strengthening members that extend in a longitudinal direction and that are laterally spaced apart from one another onto a flat planar metal outer skin sheet, so as to form thereof a preliminary flat planar structure;

b) after said step a), deforming said preliminary flat planar structure by contacting and securing at least some of said strengthening members onto a curved contour of a positive forming tool and reconfiguring said positive forming tool so as to increase a curvature defined by said curved contour, and thereby bending said outer skin sheet to have an outer sheet contour with a cross-sectional nose curvature corresponding to said curved contour, so as to form of said preliminary flat planar structure a preliminary curved structure;

c) after said step b), placing and securing said preliminary curved structure into a negative form so that said outer skin sheet contacts and is supported by a negative form surface of said negative form having a negative form surface of said negative form having a negative contour corresponding to said outer sheet contour; and d) after said step c), releasing and removing said positive forming tool from said preliminary curved structure;

wherein said positive forming tool comprises first and second forming tool members that respectively include first and second rigidly curved forming plates and that are pivotable and slidable relative to each other; and wherein said step b) comprises pivoting and sliding said first and second forming tool members relative to each other so as to decrease an angle between said rigidly curved forming plates and thereby increase said curvature defined by said curved contour that is defined along said rigidly curved forming plates and therebetween along a parabolic curve spanning a vertex of said angle between said rigidly curved forming plates, whereby it is particularly a curvature of said parabolic curve that is increased.

4. The method according to claim 3, wherein said step b) applies and establishes a pre-stress in said preliminary curved structure, and further comprising, after said step d), an additional step of connecting form ribs crosswise across and onto said strengthening members such that said form ribs take up said pre-stress and hold said preliminary curved structure so as to maintain said outer sheet contour even after removing said structure from said negative form.

5. The method according to claim 3, wherein said step b) is a cold forming step carried out at room temperature.

6. A method of fabricating a leading edge nose structure of an aerodynamic surface, comprising the following steps:

a) joining plural metal strengthening members that extend in a longitudinal direction and that are laterally spaced apart from one another onto a flat planar metal outer skin sheet, so as to form thereof a preliminary flat planar structure;

b) after said step a), deforming said preliminary flat planar structure by contacting and securing at least some of said strengthening members onto a curved contour of a positive forming tool and reconfiguring said positive forming tool so as to increase a curvature defined by said curved contour, and thereby bending said outer skin sheet to have an outer sheet contour with a cross-sectional nose curvature corresponding to said curved contour, so as to form of said preliminary flat planar structure a preliminary curved structure;

c) after said step b), placing and securing said preliminary curved structure into a negative form so that said outer skin sheet contacts and is supported by a negative form surface of said negative form having a negative contour corresponding to said outer sheet contour; and d) after said step c), releasing and removing said positive forming tool from said preliminary curved structure;

wherein said strengthening members include respective L-sectional profile members which each include a main web that protrudes substantially perpendicularly from said outer skin sheet and a stiffening flange that protrudes from said main web substantially locally parallel to said outer skin sheet;

wherein said joining in said step a) comprises a permanent, rigid integral material joining achieved by one of welding, soldering and brazing;

wherein said stiffening flange of each said L-sectional profile member has a hole therein, and said positive forming tool has holes therein; and wherein said securing of said strengthening members onto said curved contour of said positive forming tool comprises inserting respective assembly pins through said holes in said stiffening flanges of said L-sectional profile members and correspondingly through said holes in said positive forming tool respectively aligning in registration with said holes in said stiffening flanges.

7. The method according to claim 6, wherein said strengthening members further include a T-sectional profile member including a main web that protrudes substantially perpendicularly from said outer skin sheet along a longitudinally extending centerline thereof along a center of said cross-sectional nose curvature and a stiffening flange that protrudes in two opposite directions from said main web substantially locally parallel to said outer skin sheet;

wherein said joining of said T-sectional profile member in said step a) comprises a permanent, rigid, integral material joining achieved by one of welding, soldering and brazing; and wherein said T-sectional profile member is not contacted and secured onto said positive forming tool in said step b), and instead said step b) comprises bending said outer skin sheet adjacent to said T-sectional profile member along a free-form parabolic curve between two respective portions of said curved contour of said positive forming tool.

8. A method of fabricating a leading edge nose structure of an aerodynamic surface, comprising the following steps:

a) joining plural metal strengthening members that extend in a longitudinal direction and that are laterally spaced apart from one another onto a flat planar perforated metal outer skin sheet, so as to form thereof a preliminary flat planar structure;

b) after step a), deforming said preliminary flat planar structure by contacting and securing at least some of said strengthening members onto a curved contour of a positive forming tool and reconfiguring said positive forming tool so as to increase a curvature defined by said curved contour, and thereby bending said outer skin sheet to have an outer sheet contour with a cross-sectional nose curvature corresponding to said curved contour, so as to form of said preliminary flat planar structure a preliminary curved structure;

c) after said step b), placing and securing said preliminary curved structure into a negative form so that said outer skin sheet contacts and is supported by a negative form surface of said negative form having a negative contour corresponding to said outer sheet contour;

d) after said step c), releasing and removing said positive forming tool from said preliminary curved structure;

e) providing pre-curved perforated throttling sheets that have a curvature substantially corresponding to a curvature of said strengthening members in said step c), applying a sealant between said strengthening members and said throttling sheets, positioning said throttling sheets onto said strengthening members, and securing said throttling sheets onto said strengthening members using blind rivets;

f) after said step e), providing pre-curved inner ribs that have a curvature substantially corresponding to a curvature of said throttling sheets, applying a sealant between said inner ribs and said throttling sheets at least along areas of joints that extend between adjoining ones of said throttling sheets crosswise relative to said longitudinal direction, positioning said inner ribs onto said throttling sheets at least along said joints to extend crosswise relative to said longitudinal direction, and securing said inner ribs onto said throttling sheets using blind rivets;

g) after said step f), providing plural flanged U-section members that each include a U-channel and two flanges respectively protruding from two edges of said U-channel, applying a sealant between said U-channels of said U-section members and said throttling sheets, positioning said flanged U-section members to extend in said longitudinal direction respectively substantially along and aligned with respective ones of said strengthening members with said U-channels arranged on said throttling sheets while extending through respective openings in said inner ribs, and securing said U-channels onto said throttling sheets using blind rivets;

h) after said step g), providing pre-curved non-perforated inner skin sheets that respectively have a curvature substantially corresponding to respective portions of a curvature of said inner ribs, applying a sealant between said inner skin sheets and said flanges of said flanged U-section members, positioning said inner skin sheets respectively onto said flanges of said flanged U-section members, and securing said inner skin sheets respectively onto said flanges of said flanged U-section members using blind rivets; and i) after said step g), removing from said negative form a resultant nose sandwich structure including at least said outer skin sheet, said strengthening members, said throttling sheets, said inner ribs, and said flanged U-section members.

9. The method according to claim 8, wherein said step i) is carried out after said step h), and said resultant nose sandwich structure further includes said inner skin sheets.

10. The method according to claim 8, wherein said step i) is carried out before said step h), said resultant nose sandwich structure removed from said negative form does not yet include said inner skin sheets, and said step h) is carried out while said resultant nose sandwich structure is out of said negative form.

11. The method according to claim 8, wherein said providing of said pre-curved perforated throttling sheets comprises a preliminary step of bending initially flat throttling sheets by respectively contacting and securing said initially flat throttling sheets onto said curved contour of said positive forming tool and reconfiguring said positive forming tool so as to increase a curvature defined by said curved contour and thereby bending said respective throttling sheet to have a curvature corresponding to said curved contour, so as to respectively form of said initially flat throttling sheets said pre-curved perforated throttling sheets.

* * * * *

UNITED STATES PATENT AND TRADEMARK OFFICE
CERTIFICATE OF CORRECTION

PATENT NO. : 6,415,510 B2
DATED : July 9, 2002
INVENTOR(S) : Mertens et al.

It is certified that error appears in the above-identified patent and that said Letters Patent is hereby corrected as shown below:

<u>Title page,</u>
Item [75], Inventors, replace "Josef Mertens; Henri Lajain, both of Bremen (DE)" by -- Josef Mertens, Aachen; Henri Lajain, Bremen, both of (DE) --.

Signed and Sealed this

Twenty-fifth Day of March, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,415,510 B2
DATED         : July 9, 2002
INVENTOR(S)   : Mertens et al.

It is certified that error appears in the above-identified patent and that said Letters Patent is hereby corrected as shown below:

Column 12,
Line 7, after "negative" (2$^{nd}$ occurrence), delete "form";
Line 8, before "contour", delete "surface of said negative form having a negative".

Signed and Sealed this

Twenty-second Day of April, 2003

JAMES E. ROGAN
*Director of the United States Patent and Trademark Office*